Figure 1:
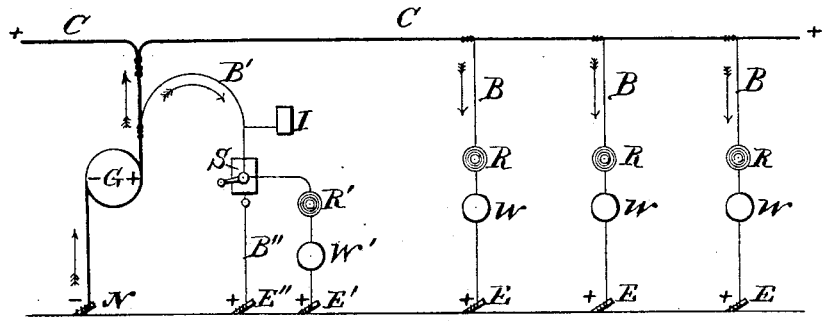

2 Sheets—Sheet 1.

C. M. BALL.
System of Electrical Lighting Circuits.

No. 233,831. Patented Nov. 2, 1880.

Witnesses: Inventor:

2 Sheets—Sheet 2.

C. M. BALL.
System of Electrical Lighting Circuits.

No. 233,831. Patented Nov. 2, 1880.

Witnesses:
John C. Ball.
A. Davenport

Inventor:
Clinton M. Ball.

UNITED STATES PATENT OFFICE.

CLINTON M. BALL, OF WATERVLIET, ASSIGNOR OF TWO-THIRDS TO JOHN B. TIBBITS, OF TROY, NEW YORK.

SYSTEM OF ELECTRICAL LIGHTING-CIRCUITS.

SPECIFICATION forming part of Letters Patent No. 233,831, dated November 2, 1880.

Application filed November 23, 1878.

*To all whom it may concern:*

Be it known that I, CLINTON M. BALL, of the town of Watervliet, in the county of Albany and State of New York, have invented a certain new and useful Improvement in a System of Electrical Circuits for Transmitting and Controlling Electricity for Light, Heat, Power, and other Purposes, of which the following is a clear, exact, and full description, reference being had to the accompanying drawings and the letters of reference marked thereon, which form a part of this specification.

This invention relates to a novel method of arranging a system of divided electrical circuits, the object being to provide a means by which the current of electricity from one or more generating sources may be distributed to a large number of points, for the purpose of application through any of the well-known appliances for service in the useful arts and sciences—as, for example, in its application to electro-chemistry, electro-metallurgy, electro-motion, and especially to electric lighting and heating upon an extended scale—an object hitherto unattained.

It is further designed to simplify the construction of lines or conductors for the distribution of the electrical current, and so to save cost in construction; to obviate the danger of short circuits occurring in the conductors, and to reduce the resistance of conductors to a minimum consistent with a proper balance and distribution of the current of electricity to all desired points, and so to avoid any waste of power in the conversion of electro-motive energy into heat in the conductors by the introduction of unnecessary resistances in the circuits.

I am aware that attempts to distribute electro-motive energy to many points have been made, and with some degree of success, by such means as the following, viz: by leading from a battery or generator of any kind of sufficient power two or more separate or independent conductors from the positive pole thereof by metallic connection to lighting apparatus, chemical baths, or other work to be performed by the electrical current, thence, by continued metallic connection, to the negative pole of the battery, each conductor being kept entirely distinct and separated from the others; also, by an arrangement of divided circuits in which free metallic conductors, extending from the positive and negative poles of the battery or other generating source, are united by two or more cross-conductors, such an arrangement constituting simply a modification and compounding of the device known to science as "Wheatstone's bridge," the work to be performed being introduced directly into the circuit upon the main or cross conductors—sometimes at a single point only upon each cross-conductor, sometimes at two or more points—by the arrangement known as "in series," and in some instances with complicated and wasteful contrivances for diverting a portion of the current upon the main or cross-conductors into subcircuits or loops united at two points to the conductors. These systems are deficient in any general application, the former being expensive in construction and capable of only very limited extension, and, while the latter is capable of a somewhat wider extension, the same objections still hold as against it also, with the additional ones of extreme complication in the minor details of the system and great waste of power, occasioned by the introduction of numerous artificial resistances in the circuits and subcircuits. I prefer a different and a much simpler arrangement, by means of which the above objections are avoided.

My invention consists, essentially, of a new and useful arrangement of a system of insulated conductors, in combination with one or more generating sources of electricity and means for automatically controlling the intensity of the current or charge of electricity upon the conductors and its action in the lamps or other working devices.

Figure 2:
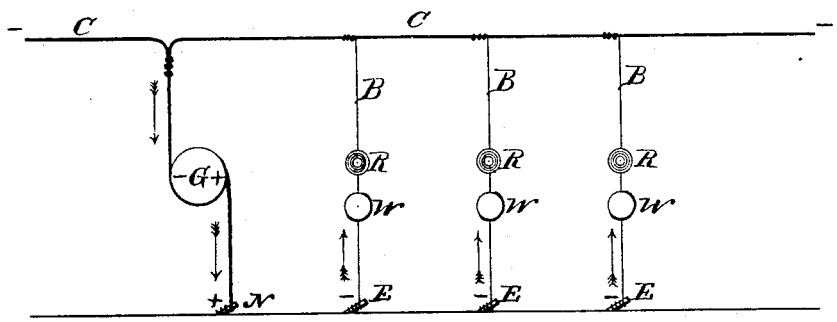
Figure 3:
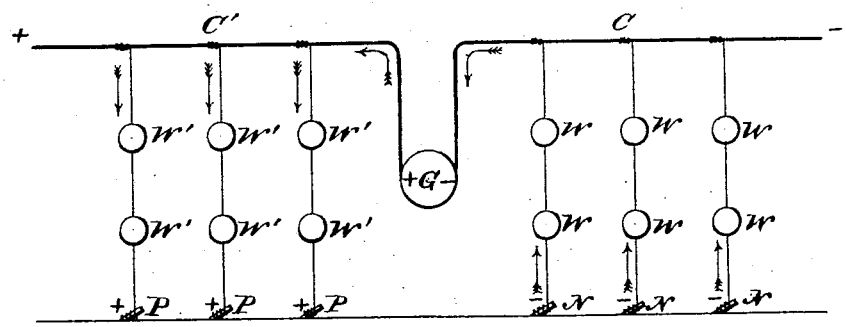
Figure 4:
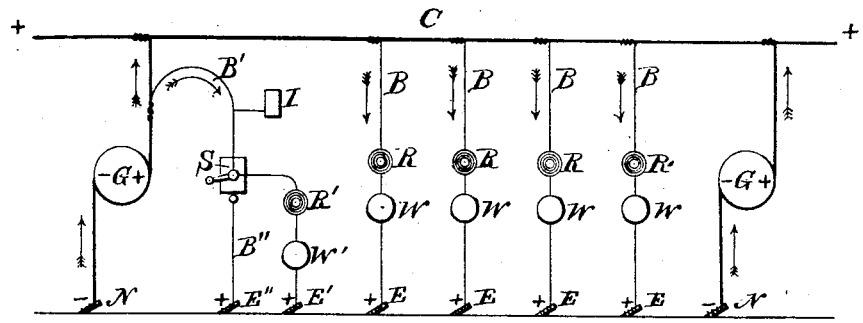
Figure 5:
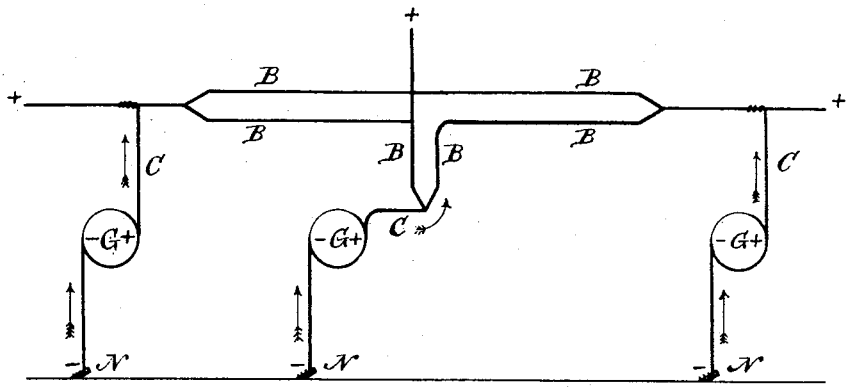

In the drawings, Figures 1, 2, 3, Sheet 1, and Figs. 4, 5, Sheet 2, represent different forms of arrangement of circuits upon this improved plan.

Fig. 1 shows a simple arrangement consisting of a single generating source, G, which, however, may be constituted of compound batteries or several electrical machines, united at its positive electrode with conductor C C, having branches, as represented at B B B and B', in which the work to be performed is introduced, as indicated at W W W and W', with earth connections E E E, E', and E'', the negative electrode of the generating source being connected with the ground, as indicated at the earth-connection N, the flow of the electrical current being established in the direction indicated by the arrows.

Fig. 2 shows the same arrangement as Fig. 1, with the exception that the conductor C C is connected with the generating source at its electrode of minus sign, which arrangement would result in the flow of the electrical current being established, in the direction indicated by the arrows, from the earth-connections E E E, through the conductors, to the ground at N; or by compounding this arrangement with that shown in Fig. 1 the system will then be as shown in Fig. 3.

Fig. 3 shows an arrangement with the generator G between two systems of earth-connections and conductors, the generator, by its action, establishing a flow of the electrical current from the ground-connections at N, by way of the conductors C C', to the earth-connections at P, and work for the electrical current to perform may be introduced upon the branches, as shown at W, or upon the main conductors.

Fig. 4 shows a compound arrangement consisting of two generating sources, G G', united at their positive electrodes with a conductor, C C, having branches B B B and B', in which the work to be performed is introduced, as indicated at W W W W and W', with earth-connections at E E E E, E', and E'', the negative electrodes of the generating sources being connected with the ground, as indicated at N N, the flow of the electrical current being established in the direction indicated by the arrows.

Fig. 5 shows a still further compounding of the system by the introduction into circuit of three generating sources united at their positive electrodes to the compound system of conductors C C C, with primary branches B B, B B, B B, all united into a compound system, from which secondary branches may be led off in any direction, and upon which work may be introduced, and thence connected with the ground, (the secondary branches, with their ground-connections, not being shown in the drawings, as the arrangement has already been fully delineated in the preceding figures,) the negative electrodes of the generating sources being connected with the ground, as indicated at the earth-connections N N N.

Figure 6:
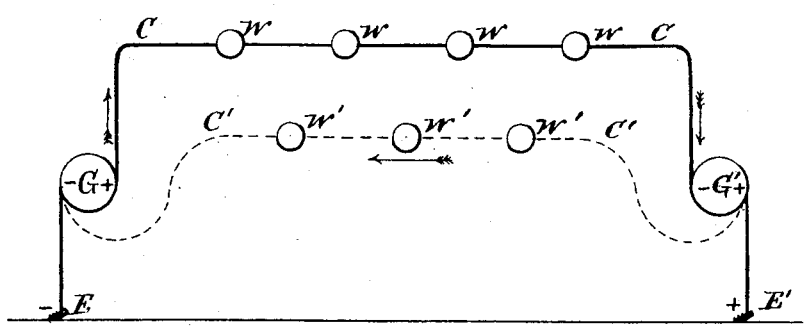

Fig. 6 shows another and somewhat different arrangement, in which the generating sources are duplicated, the generators having connections with the ground from their electrodes of opposite sign, which would result in an electrical current of high intensity being established in the conductors C C, in the direction indicated by the arrows, between the earth-connections E E'; or the earth-connections may be omitted and the other two electrodes of the generators G G' united by a separate conductor, C', as indicated by the dotted line.

The movement of electro-motive energy along the conductors C C and C' may be applied to the performance of work introduced in series, as indicated at W; but this arrangement is shown only as exhibiting a possible variation of my plan for multiplying the generating sources.

Having outlined the construction of lines or conductors, I will now describe the operation of my invention.

Where the arrangement is a simple one, comprising only a single generating source, as shown in Figs. 1 and 2, and the battery or machine presents only two electrodes of opposite sign, the conductor distributing the current by my plan is united with one electrode, or, if more than two electrodes are presented by a multiplication of parts at the generating source, the same is united by branches with all the electrodes of like sign of the generator or generators, and, proceeding thence, again branches without the intervention of artificial resistances to all desired points. Where the arrangement is a compound one, comprising two or more generating sources, as indicated in Figs. 4 and 5, the conductors distributing the current are united with and connect all electrodes of like sign of the generators introduced in the compound circuit, and are provided with any number of branches in any direction, as before, without the introduction of artificial resistances, the electrode or electrodes of opposite sign of the generator or generators being connected with the ground.

As will be seen by the arrangement shown in all but Fig. 6, the electrical condition of the conductor or conductors and their branches becomes, and may be maintained by the action of the generators, either electro-positive or electro-negative in their relation to the earth, accordingly as they are connected with the electrode or electrodes of plus or minus sign of the generating source or sources, and the electro-motive energy developed, which is the exact equivalent of the difference in electrical potential established between the insulated conductors and the earth by the action of the generators, may be made to perform any useful work to which it is capable of being applied by introducing the same in a special circuit at any point between the conductor or conductors and the earth, the resistance offered by the work producing a check upon the current, and, taken in connection with auxiliary resistances, which may be introduced in the same special circuits at R R R and R' in the various figures, for the purpose of controlling or graduating the flow of the same, operates to prevent the passage of only so much of the electric current as is required to perform a desired amount of work at a given point. The reserve of energy, being thus held back upon or from the line, secures a distribution of the electrical current to all points where connections are made between the conductors and the earth in the manner shown in the drawings, and the result above described would follow from this arrangement of the generators and conductors, whether the direction of electrical force at any ground-connection were constant in one direction or in alternately-opposite directions, as might be the case if magneto-electric or other machines were used which furnish alternating currents. It is plain, however, that in such case the electro-motive energy could not be applied to some purposes for which it might be made useful if constant in one direction.

Referring again to the drawings, I provide a means for controlling and regulating the intensity of the current or charge upon the line by introducing upon a branch from the conductor, at any convenient point, B', Figs. 1 and 4, an electrometer or galvanometer, I, constructed in any of the well-known forms, and with its proper connections for exhibiting at all times the amount of statical or dynamic charge upon the system of conductors, and at S, Figs. 1 and 4, is introduced an electro-magnetic safety-switch, which may be of any of the well-known forms, the direct connection of the primary branch B' being through the continuation, by way of resistance R', work W', to ground-connection at E', the direction of the current being changed by the action of the electro-magnet in the switch S, through a specially-provided conductor, into the ground. Whenever the intensity of the charge upon the conductors rises above the normal or proper amount, such excess of charge being discharged into the ground at E'' through the secondary conductor B'', and the resistance R' in Figs. 1 and 4 being equal to or balancing the greatest resistance introduced upon any other branch by the work with its auxiliary coil or rheostat.

Some of the advantages pertaining to the use of this invention are as follows: By my system of ground-connections, as herein described, I am able to compound and extend these divided electrical circuits indefinitely and without bringing the conductors back to the generators.

In the second place, the charging of the conductors by compound generators arranged at different points upon the circuits of conductors and connected therewith by their electrodes of like sign operates to neutralize any fluctuations or unsteadiness in the flow of the electrical currents at the taps, as the fluctuations in the current proceeding from one generator would rarely synchronize with another.

I do not claim, broadly, ground-connections in electrical circuits; but

What I do claim as my invention, and desire to secure by Letters Patent, is—

1. The above-described means of combining the electric currents from a number of sources of electricity for supplying illuminating or other apparatus, in combination with resistance introduced in the various branches from the main conductors and an automatic switch placed in a ground-connection from the conductors for relieving the line of any abnormal charge, whereby an equal and uniform distribution of the charge of electricity to all parts of the line of conductors is effected.

2. In a system of divided electrical circuits, electrical generators attached at suitable points, in combination with their respective ground-connections, and the conductors with their ground-connections, and an automatic switch placed in a supplementary ground-connection, for regulating the intensity of the charge upon the conductors, substantially as herein described.

In witness whereof I have hereto set my hand this 18th day of November, 1878.

CLINTON M. BALL.

Witnesses:
N. DAVENPORT,
JOHN C. BALL.